Figure 9:
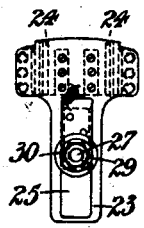

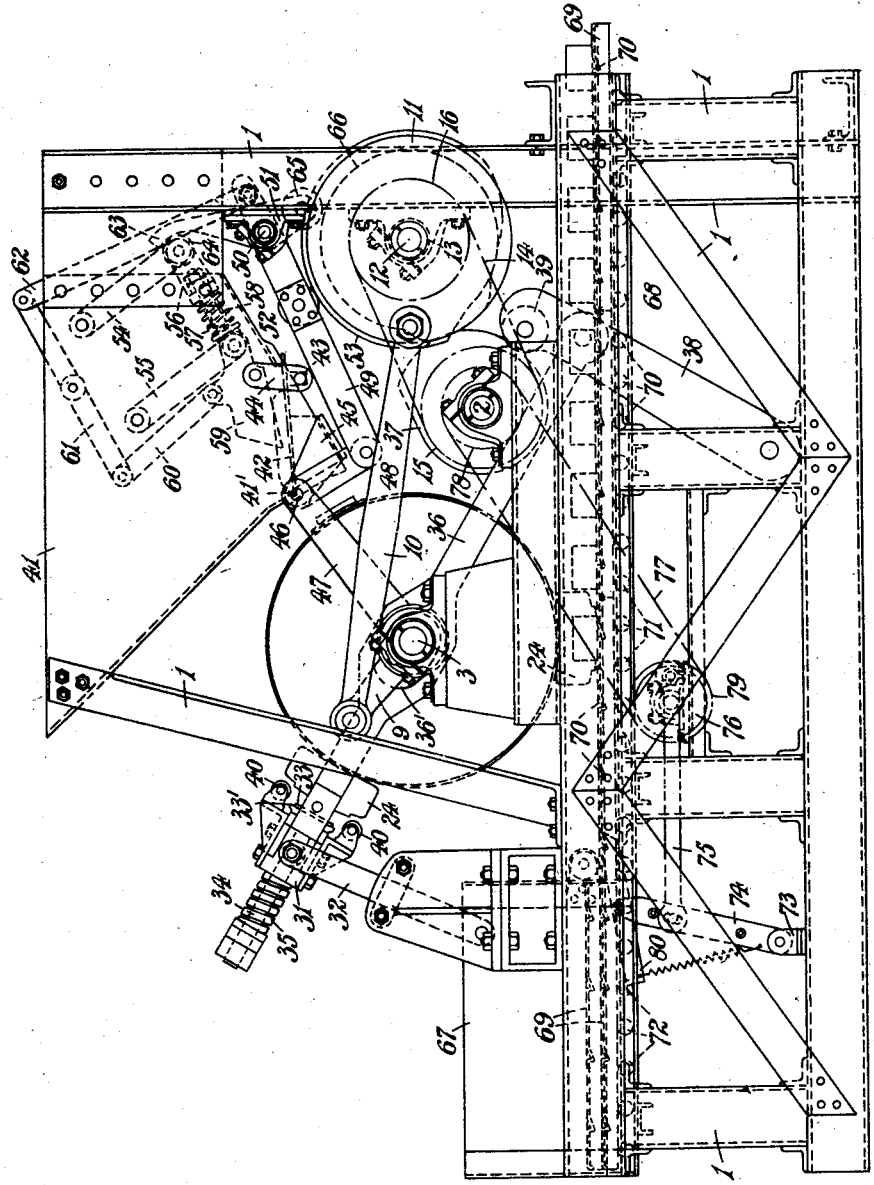

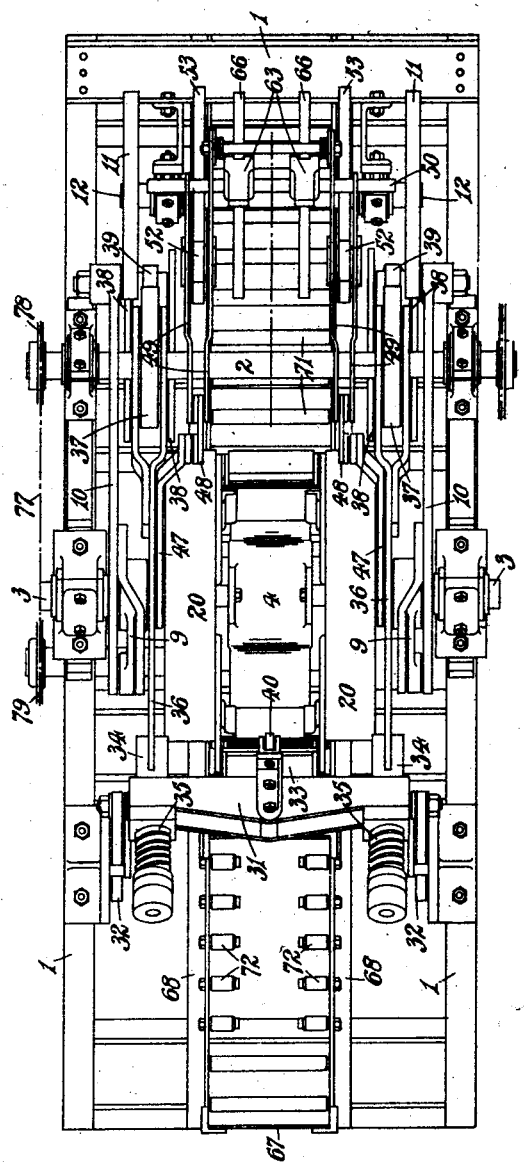

June 5, 1928.
D. G. MACKENZIE
1,672,619
BRICK MOLDING MACHINE
Filed May 31, 1927          7 Sheets-Sheet 3
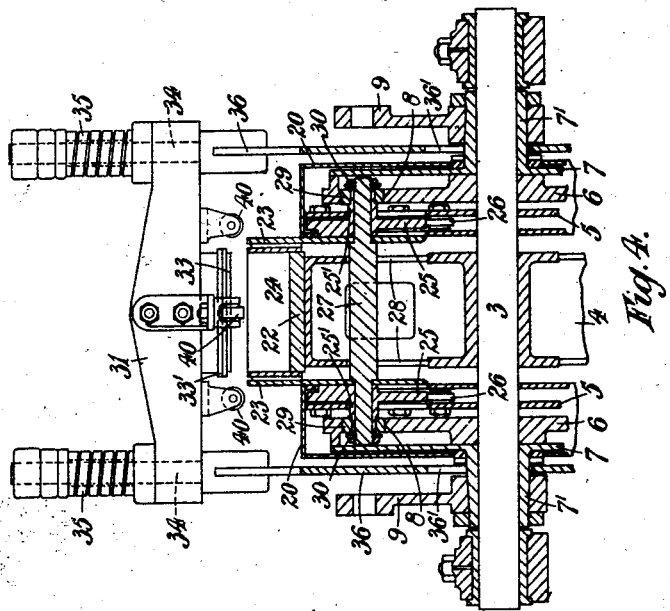
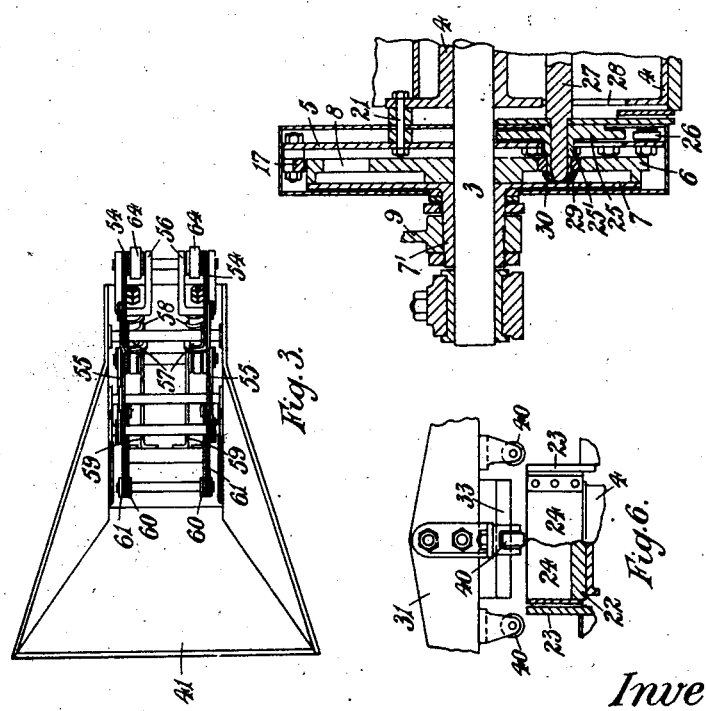
Inventor.
Duncan Gordon Mackenzie
BY Reeep, Baye+Bakeler
ATTORNEYS.

June 5, 1928.
D. G. MACKENZIE
1,672,619
BRICK MOLDING MACHINE
Filed May 31, 1927
7 Sheets-Sheet 4
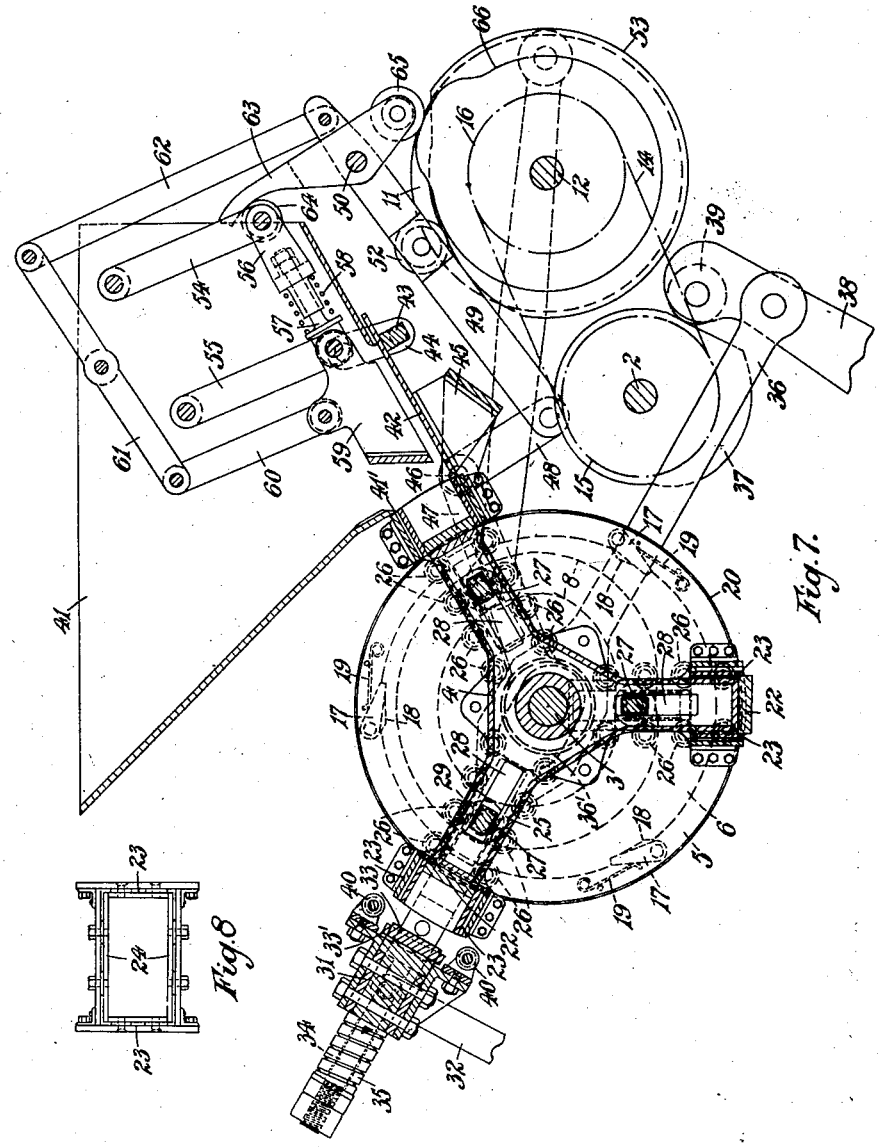
*Inventor.*
Duncan Gordon Mackenzie
BY: Reeg, Boyce & Bakeler
ATTORNEYS June 5, 1928. 1,672,619
D. G. MACKENZIE
BRICK MOLDING MACHINE
Filed May 31, 1927 7 Sheets-Sheet 5

Inventor.
Duncan Gordon Mackenzie
BY: Ruegg Boyer & Bakelaw
ATTORNEYS

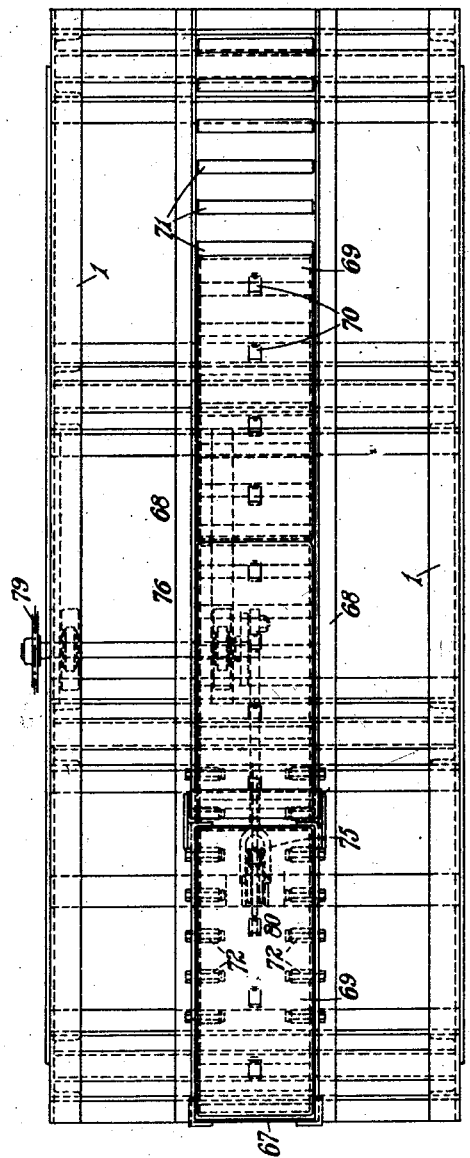

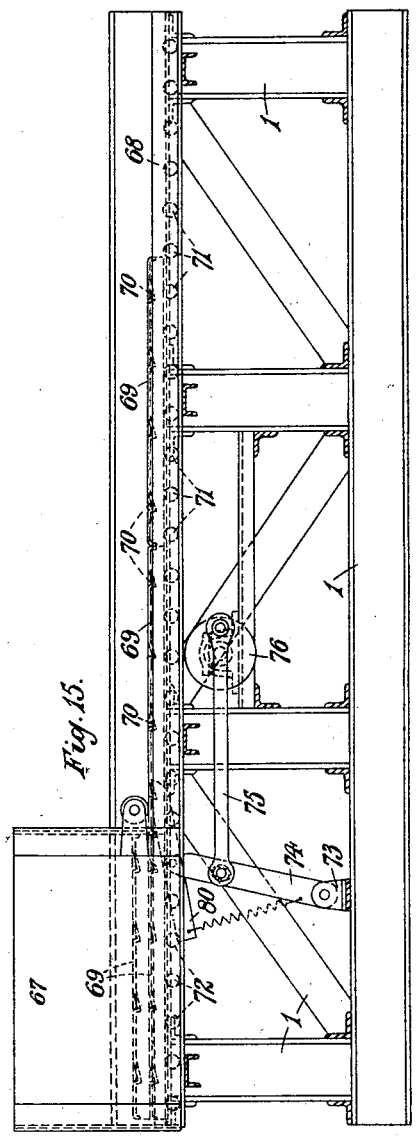
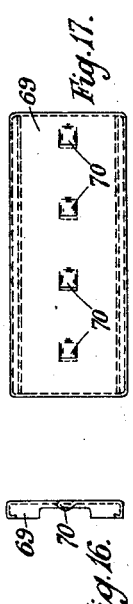

Patented June 5, 1928.

1,672,619

UNITED STATES PATENT OFFICE.

DUNCAN GORDON MACKENZIE, OF ILFORD, ENGLAND.

BRICK-MOLDING MACHINE.

Application filed May 31, 1927, Serial No. 195,165, and in Great Britain May 31, 1926.

The invention consists of an improved machine for molding bricks, tiles, road setts and the like by pressure from aggregate or the like.

The improved machine comprises a suitably constructed frame within which are disposed the majority of the working parts of the machine. Within said frame and on a common shaft supported by said frame are mounted two members. One of these members, which serves as a support for certain of the walls of the molds used in the machine, is adapted to be rotated step by step in one direction only, while the second of said members, which serves as a driver for said first mentioned member, is adapted to be rotated to and fro. The angle through which said members are rotated depends upon the number of molds employed, being 120° if three molds are used. Four of the walls of each of the molds with which the machine is provided are made as one piece, so as to constitute a box without bottom or top, and are slidably mounted in guides or between rollers on said first mentioned member and are moved in said guides or between said rollers at the required times through the medium of a cam groove formed in or carried by the second of said members. The bottom wall of each of the molds is relatively stationary and may be constituted by a face on said first mentioned member. The remaining or sixth wall of each mold is constituted by the head of a ram which is adapted when the parts of said first mentioned member are brought opposite said ram to bear against the slidable walls of the molds and to more or less compress or consolidate the contents of the molds, the head of said ram being provided on its front face with a projection adapted to exactly fit the spaces obtaining between the inner faces of the slidable walls of the molds. Alternatively, and this is preferable as it facilitates the construction of the machine, the front part of said ram is made of such shape that it does not bear against the outer ends of the slidable walls of the molds but merely fits between the inner faces of said walls. The machine is provided with a hopper for feeding material to the molds and with means located in the lower part of the machine, for removing the bricks, tiles or the like, formed in the machine. The hopper is fitted with means by which its bottom will be opened and closed at the required times and with means for mechanically filling the molds and for strickling off the material level with the tops of the molds.

When the machine is provided with three molds, the molds are disposed at equal distances apart around the centre of the machine and the bottom of the hopper for feeding material to the molds and the ram through which the contents of the molds are compressed are arranged with their centre lines coincident with lines disposed at angles of 60° to a vertical plane passing through the centre of the shaft on which are mounted the above referred to first and second members.

The accompanying drawings illustrate a machine constructed in accordance with the invention.

Figure 10:
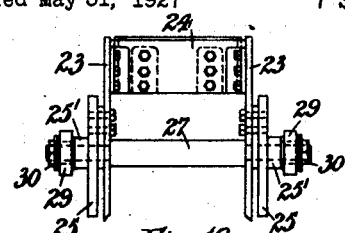
Figure 11:
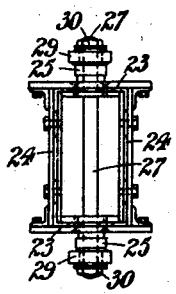
Figure 12:
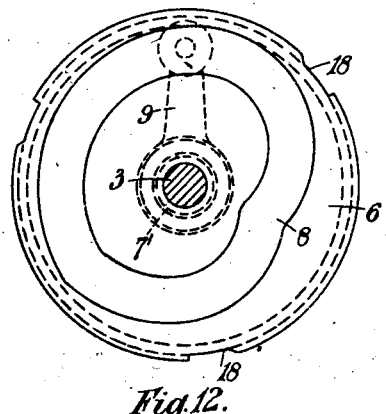
Figure 13:
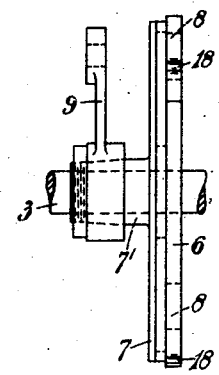

Fig. 1 is a side elevation of the machine. Fig. 2 is a plan of the machine, the hopper for containing the material to be used in the machine and the parts associated with said machine being removed. Fig. 3 is a plan of said hopper and the parts associated therewith. Fig. 4 is a part section and part elevation illustrating the manner in which the members of the molding part of the machine are arranged and constructed. Fig. 5 is a section fulfilling the same purpose as Fig. 4. Fig. 6 is a fractional view illustrating an alternative form of the head of the ram of the machine and parts of one of the molds used in the machine. Fig. 7, drawn to a larger scale than the above described figures, is a part section and part elevation illustrating more clearly certain parts of the machine shown in some of the above described figures. Fig. 8 is a plan of the slidable walls of the molds used in the machine. Figs. 9 and 10 are elevations and Fig. 11 is a plan of said slidable walls with certain parts added thereto. Figs. 12 and 13 are respectively a face view and a side view of two discs which constitute one half of what is hereinafter, for the sake of distinction, termed the second member of the molding part of the machine, and the arm by which said discs are rotated to and fro. Figs. 14 and 15 are a plan and a side view of the lower part of the machine, illustrating how bricks or the like formed in the machine are delivered from the machine. Figs. 16, 17 and 18 are views of the plattens for the bricks or the like.

Referring now to these drawings, 1 is the frame of the machine, between the sides of which frame are disposed the majority of the working parts of the machine. 2 is the driving shaft of the machine. 3 is a second shaft upon which are mounted two members, one of which members hereinafter referred to, for the sake of distinction, as the first member of the molding part of the machine, is during the operation of the machine rotated step by step in one direction only, while the other member, hereinafter referred to, for the sake of distinction, as the second member of the molding part of the machine, serves as a driver for said first member and is rotated to and fro.

Said members of the molding part of the machine are constructed and arranged as follows:—

The first member of the molding part of the machine consists of a hollow casting 4 of the shape illustrated by the drawings, and shown most clearly in Fig. 7, which is keyed to the shaft 3, and of two discs 5, which are connected, as hereinafter described, to the casting 4 and rotate therewith. The second member of the molding part of the machine is constructed of two pairs of discs 6, 7, which are rotatably mounted on the shaft 3 at suitable distances on either side of the discs 5 of the first member of the molding part of the machine. The discs 6 of the pairs of discs 6, 7 are recessed on their outer faces and are provided with cam grooves 8, while the discs 7 of the pairs of discs 6, 7, which serve as covers for the discs 6 and are screwed to same, are formed with hubs $7^1$. To these hubs $7^1$ are secured arms 9 which are moved through an angle corresponding to the angle obtaining between any two of the molds used in the machine by means of connecting rods 10 and crank discs 11 keyed to a shaft 12. The shaft 12, which is mounted in bearings 13 bolted to the frame 1 of the machine, is driven from the shaft 2 by means of a chain 14 and chain wheels 15 and 16. The discs 5 of the first member of the molding part of the machine are, as shown most clearly in Fig. 7, provided with sets of pawls 17 corresponding in number to the number of molds, three molds, used in the machine, and the discs 6 of the second member of the molding part of the machine are formed with a corresponding number of notches 18 into which the pawls 17 are constantly pressed by means of springs 19. The discs 5, and 6 and 7 of the two members of the molding part of the machine and the parts associated therewith are enclosed in casings 20 which are secured to the hollow casting 4 and to the discs 5 of the first member of the molding part of the machine by means of bolts 21 passing through said hollow casting and discs and through the inner walls of the casings.

The molds used in the machine consist of bottom walls, which may be constituted by the outer faces of the hollow casting 4 of the first member of the molding part of the machine but preferably consist of plates 22 secured to said faces and of four slidable walls 23, 24, which, as previously mentioned, and as shown in the accompanying drawings, more particularly Fig. 8 and Figs. 9, 10 and 11, are made as one piece, so as to constitute a box without bottom or top. Two of these walls, the walls indicated by 23, are made of greater length than the other walls 24, and to the outer faces of these longer walls are screwed slippers 25. The slippers 25, which are provided with long bosses or hubs $25^1$, are slidably mounted on the discs 5 of the first member of the molding part of the machine, in such manner that they can only move on lines radially disposed with respect to the shaft 3, by means of rollers 26 mounted on said discs 5. Shafts 27, made of such lengths as to extend into the recessed parts of the discs 6 of the second members of the molding part of the machine, pass through slots 28 formed in the side walls of the hollow casting 4 of the first member of the molding part of the machine and through holes formed in the longer walls 23 of the slidable walls 23, 24 of the molds and the slippers 25. Upon the long bosses or hubs $25^1$ of the slippers 25 are mounted rollers 29 which engage with the cam grooves 8 formed in the discs 6 of the pairs of discs 6, 7, constituting the second member of the molding part of the machine, and are secured in position on said bosses or hubs by means of nuts 30 engaging with the ends of the shafts 27. The cam grooves 8 are made of the shape shown in Figs. 7 and 12, see particularly Fig. 12, that is to say comprise a part along which the rollers 29 travel whilst the slidable walls 23, 24 of the molds remain stationary, a part along which the rollers 29 travel when said slidable walls 23, 24 are, during compression of the contents of the molds, moved to a slight extent towards the centre of the shaft 3, a third part in which the rollers travel when said slidable walls are moved clear of the bricks or the like formed in the machine to allow them to be delivered and removed from the machine, and a fourth part for moving said walls to enable the molds to be again filled.

The contents of the molds are compressed at the required time by means of a ram which closes the open ends of the molds. This ram consists of a crosshead 31, which is supported in position by means of a pair of rocking arms 32, a head 33, the ram proper, at the centre of the crosshead, two stout bolts or headed rods 34 which are passed through holes formed in the ends of the crosshead 31, adjustable cushioning springs 35 surrounding the stems of said headed rods 34, and long links 36, for operating the ram, which are provided at their centres with slots 36¹, so that they may bestride the shaft 3. The long links 36 are actuated at the required times, that is to say, when the contents of a mold are to be compressed, by any suitable means, such, for instance, as cams 37 keyed to the driving shaft 2 of the machine and pivoted arms 38 which are connected to the long links 36 and are provided at their outer ends with bowls 39, adapted to bear against the cams 37. The head 33 on the centre of the crosshead 31 may be of the form illustrated in Fig. 4, that is to say may be provided at a suitable distance from its front face with a shoulder 33¹ which, after the front of the head has entered the upper part of the space obtaining between the slidable walls 23, 24, of a mold, and thereby closed the outer end of the mold, bear against the ends of the slidable walls 23, 24 of the mold. Alternatively, as shown in Fig. 6, said shoulder may be dispensed with, the head 33 being made throughout its length of a size corresponding to the space obtaining between the slidable walls 23, 24 of the molds. In both cases the crosshead 31 is provided with rollers 40 which are adapted when the crosshead is moved towards the centre of the shaft 3 to bear against the slidable walls 23, 24 of the molds.

The material from which the bricks or the like are to be made is contained in a hopper 41, which is supported at the upper part of one end of the frame 1 of the machine. This hopper 41, see Figs. 1 and 7, is provided at its bottom with a door 42 through the medium of which the bottom of the hopper can be opened and closed at the required times. This door 42 is secured at its rear end to a bar 43, which is mounted in the lower ends of a pair of short links 44 that are pivotally supported from the sides of the hopper 41, while the front end of the door 42 is provided with a pair of ears 45. On pins 46 passing through these ears 45 are mounted the outer ends of two arms 47, which are supported at their other ends on the shaft 3 of the machine and also short links 48. The lower ends of these short links 48 are pivotally connected to one of the ends of two rocking levers 49. These rocking levers 49 are mounted on a shaft 50, which is supported in bearings 51 bolted to the frame 1 of the machine, and are provided with bowls 52. These bowls 52 bear against cams 53 secured to the shaft 12 of the machine, and during a certain part of the rotation of said cams 53 the levers 49 will be rocked and the door 42 of the hopper 41 will be turned upwards so as to close the bottom of the hopper. During this movement of the door 42, it will travel with the mouth of the hopper 41, its front edge following the shaped outer ends of the walls of said mold. At the same time the material contained in the mold will be strickled or levelled off by a lip 41¹ provided at the upper part of the mouth of the hopper.

The material contained in the hopper 41, which is suitably fed thereto in limited quantity, is forced into the molds of the machine by means of a pusher contained in the hopper. This pusher, see Figs. 1 and 7, is supported in position in the hopper 41, by means of links 54 and 55, and is constructed in three parts, a rear part 56 which is supported by the links 54, a central part 57 which is supported by the links 55, is slidably mounted in the rear part 56, and is maintained in position by means of a coiled spring 58 interposed between the two parts, and a pivoted front part 59, which is formed with a sloping face. The front part 59 of the pusher is supported by means of links 60 from the front ends of a pair of two-armed rocking levers 61 which are pivotally supported on the sides of the hopper 41, and are connected at their rear ends by links 62 to the outer ends of the rocking levers 49, hereinbefore referred to in connection with the means for operating the door 42 of the hopper. Said pusher is actuated at the required times by levers 63 which are mounted on the shaft 50 on which are mounted the rocking levers 49. The levers 63 bear at their upper ends against rollers 64 on the rear part 56 of the pusher 56, 57, 58, 59, and are provided at their lower ends with bowls 65. These bowls 65 bear against cams 66 on the shaft 12 of the machine. At a certain period during each revolution of the cams 66 the pusher 56, 57, 58, 59 will be moved forwards so as to force material into the mold which is then opposite the mouth of the hopper 41, and when the rocking levers 49, through the medium of which the door 42 of the hopper is turned upwards, are rocked the front part 59 of the pusher 56, 57, 58, 59 will be swung upwards. As shown, the degree of compression of the coiled spring 58 is adapted to be varied so as to determine the quantity of material forced into the molds of the machine by the pusher.

The bricks or the like formed in the machine are delivered from the machine by the means now to be described with special reference to Figs. 14 to 18 of the accompanying drawings.

An upright casing or magazine 67 is secured to two of the longitudinal girders 68 which form the central part of the lower portion of the frame 1 of the machine, and within this magazine 67 are placed a pile of plattens adapted to receive the bricks or the like. These plattens 69, as will be seen from an inspection of Figs. 14 to 18, more particularly Figs. 16 to 18, consist of dished plates, somewhat resembling a shallow lid of a box, which are provided on the central parts of their lower surfaces with a suitable number of spaced projections 70 or the like. In front of the magazine 67 and between said girders 68 are mounted rollers 71 which bridge the space obtaining between the girders, while on the parts of the girders 68, which are located below the magazine 67 are mounted rollers 72 which are of such length that a gap of suitable width will obtain between the rollers. In a bearing 73 secured to one of the lowermost transverse members of the lower part of the frame 1 of the machine is mounted a rocking lever 74 which is adapted to be moved to and fro by means of a connecting rod 75 and a crank disc 76, said crank disc being rotated by means of a chain 77 and chain wheels 78 and 79. To the upper end of said rocking lever 74 is pivoted a short lever or pawl 80 which is adapted when the lever 74 is moved to and fro to engage with the projections 70 on the lowest of the plattens contained in the magazine 67. This platten as it is pushed forward on the rollers 70 will push forward the platten in front of it, and will, in its turn, be pushed forward by the next platten withdrawn from the magazine, and so on, with the result that there will be a continuous progression, whilst the machine is running, of plattens, and the bricks or the like deposited on said plattens will be continuously delivered from the machine.

Assuming that the improved machine is provided with three molds, as shown in the drawings, the machine will operate as follows:—

At the start one of the three molds with which the machine is provided, hereinafter referred to as mold A, will be immediately below the feeding hopper of the machine, a second mold, hereinafter referred to as mold B, will be opposite the ram adapted to effect compression or consolidation of the contents of the molds, while the third mold, hereinafter referred to as mold C, will be above one of the plattens by which the bricks or the like are delivered from the machine.

Assuming that mold A has been filled with the necessary amount of material, both the first and second members of the molding part of the machine are turned through an angle of 120° in the same direction, a direction which will, for the sake of brevity, be hereinafter mainly referred to as a forward direction. During this movement of said members mold A will be moved from below the feeding hopper of the machine into position below the ram by which compression or consolidation of the contents of the molds is effected, mold B will be moved into position above one of said plattens in the lower part of the machine, and mold C will be moved into position below the hopper of the machine. The second member of molding part of the machine is now turned through an angle of 120° in the direction opposite to that in which it was previously rotated, hereinafter referred to as the reverse direction. During this movement of the second member of the molding part of the machine no rotary movement of the first member of the molding part of machine will take place, but the slidable walls of mold C will be moved outwards from the centre of the shaft upon which said members are mounted ready for filling, and the sildable walls of mold A will be moved towards the centre of said shaft and the head of the ram of the machine will enter the space obtaining between the slidable walls of mold A and effect compression or consolidation of the contents of mold A. At the same time a suitable quantity of material will be fed into the mold C. Both of the members of the molding part of the machine are now turned through an angle of 120° in a forward direction, i. e., in the direction in which they were previously and simultaneously rotated. During this simultaneous movement of the two members of the molding part of the machine mold A, containing a compressed brick or the like, will be moved into position above a platten in the lower part of the machine, and mold C will be moved into position opposite the ram. The second member of the molding part of the machine is again turned through an angle of 120° in the reverse direction, while the first member of the molding part of the machine again is stationary. During this movement of the second member of the molding part of the machine the sildable walls of mold C and also said ram will be moved towards the shaft upon which are mounted the members of the molding part of the machine, and the contents of this mold will be compressed, in like manner as the contents of mold A were compressed, the slidable walls of mold A will be moved towards the centre of the shaft on which are mounted the members of the molding part of the machine so as to allow the compressed brick or the like in this mold to be delivered on to a platten in the lower part of the machine and the slidable walls of mold B to be moved outwards from said shaft. The members of the molding part of the machine will now again be simultaneously turned through an angle of 120° in a forward direction, with the result that mold A will be moved into position below the feeding hopper, mold B will be moved into position opposite the ram, and mold C will be moved into position over a platten in the lower part of the machine. The second member of the molding part of the machine is now turned through an angle of 120° in the reverse direction. During this part of the cycle of operations of the machine mold A will be filled with material, and the slidable mold B will be compressed, and the slidable walls of mold C will be moved towards the centre of the shaft upon which are mounted the members of the molding part of the machine. Everything is now as at the start, except that at the start molds B and C were empty.

As will be readily understood a machine constructed in accordance with the invention may be provided with more than three molds. For instance, the machine may be provided with sets of two or more molds disposed side by side. Further, the arrangement of plattens, rollers and rocking lever hereinbefore described as a means for delivering formed bricks from the machine may be replaced by any suitable form of conveyor.

Although the machine constituting the present invention has been described in connection with the manufacture of bricks, tiles, road setts and the like, the machine can obviously be used for molding other articles.

What I have invented and desire to secure by Letters Patent of the United States of America is as follows:—

1. A machine for molding bricks, tiles, road setts and other articles, by pressure from aggregate or the like, comprising a member which is adapted to be rotated step by step in one direction only, a second member adapted to be rotated to and fro, molds consisting of stationary bottom walls carried by said first mentioned member and side walls slidably mounted on said member, means for moving said slidable mold walls, and a ram for compressing or consolidating the contents of said molds, substantially as described.

2. A machine for molding bricks, tiles, road setts and other articles, by pressure from aggregate or the like, consisting of a member which is adapted to be rotated step by step in one direction only, a second member adapted to be rotated to and fro and serving as a driver for said first mentioned member, molds comprising relatively stationary bottom walls, carried by said first mentioned member, and four walls, made as one piece, which are slidably mounted on said first mentioned member and are moved as required through the medium of cam mechanism consisting of cam grooves in said second member and bowls engaging said cam grooves and carried by said first member, and a ram for compressing or consolidating the contents of said molds, substantially as described.

3. A machine for molding bricks, tiles, road setts and other articles, by pressure from aggregate or the like, consisting of a member which is adapted to be rotated step by step in one direction only, a second member adapted to be rotated to and fro, molds comprising stationary bottom walls carried by said first mentioned member and side walls slidably mounted on said member, means for moving said slidable mold walls, a hopper, for containing the material for filling said molds, provided at its bottom with a mouth and with a door for opening and closing said mouth, a pusher in said hopper for forcing material from the hopper into said molds provided with a pivoted front part, means for operating said pusher, for raising and lowering the pivoted front part of said pusher as said door is closed and opened, and for causing the front end of said door to follow the outer ends of the molds, a lip at the upper part of the mouth of said hopper for strickling or levelling off the material in said molds, and a ram for compressing or consolidating the contents of said molds, substantially as described.

4. A machine for molding bricks, tiles, road setts and other articles by pressure from aggregate, consisting of a member which is adapted to be rotated step by step in one direction only, a second member adapted to be rotated to and fro, molds comprising stationary walls carried by said first mentioned member and side walls slidably mounted on said member, means for moving said slidable mold walls, a hopper, for containing the material for filling said molds, provided at its bottom with a mouth and with a door for opening and closing said mouth, a pusher in said hopper for forcing material from the hopper into said molds constructed of a rear part, of a central part which is slidably mounted in said rear part and is maintained in position by an adjustable coiled spring, and of a front part pivoted to said central part, means for operating said pusher, for raising and lowering the pivoted front part of said pusher as the door of the hopper is closed and opened, and for causing the front end of said door to follow the outer ends of the mouth molds, a lip at the upper part of the mouth of said hopper for strickling or levelling off the material in said molds, and a ram for compressing or consolidating the contents of said molds, substantially as described.

5. A machine for molding bricks, tiles, road setts and other articles, by pressure from aggregate or the like, consisting of a member which is adapted to be rotated step by step in one direction only, a second member adapted to be rotated to and fro, molds comprising stationary bottom walls carried by said first mentioned member and side walls slidably mounted on said member, means for moving said slidable mold walls, a ram for compressing or consolidating the contents of said molds, and means for delivering from the machine the bricks or the like formed in the machine consisting of plattens in the form of dished plates provided on the central parts of their lower surfaces with spaced projections, a casing or magazine, for containing a pile of said plattens, supported at one end of the lower part of the framing of the machine, rollers located in front of said casing or magazine which are rotatably mounted at both of their ends in the lower part of the framing of the machine and are made of such lengths as to serve as supports for said plattens along the whole of the widths of the plattens, pairs of rollers located below said casing or magazine which are rotatably mounted at only one of their ends in the lower part of the framing of the machine and are made of such lengths as to leave gaps between their proximate ends, and a reciprocating pawl working in the gaps between said pairs of rollers and co-operating with the spaced projections on the lowermost of the plattens contained in said casing or magazine, substantially as described.

In testimony whereof I have signed my name to this specification.

DUNCAN GORDON MACKENZIE.